Search Room
BEST AVAILABLE COPY
131
order by name + date
E. Bates,
Converting Motion.
Patented July 27, 1833.
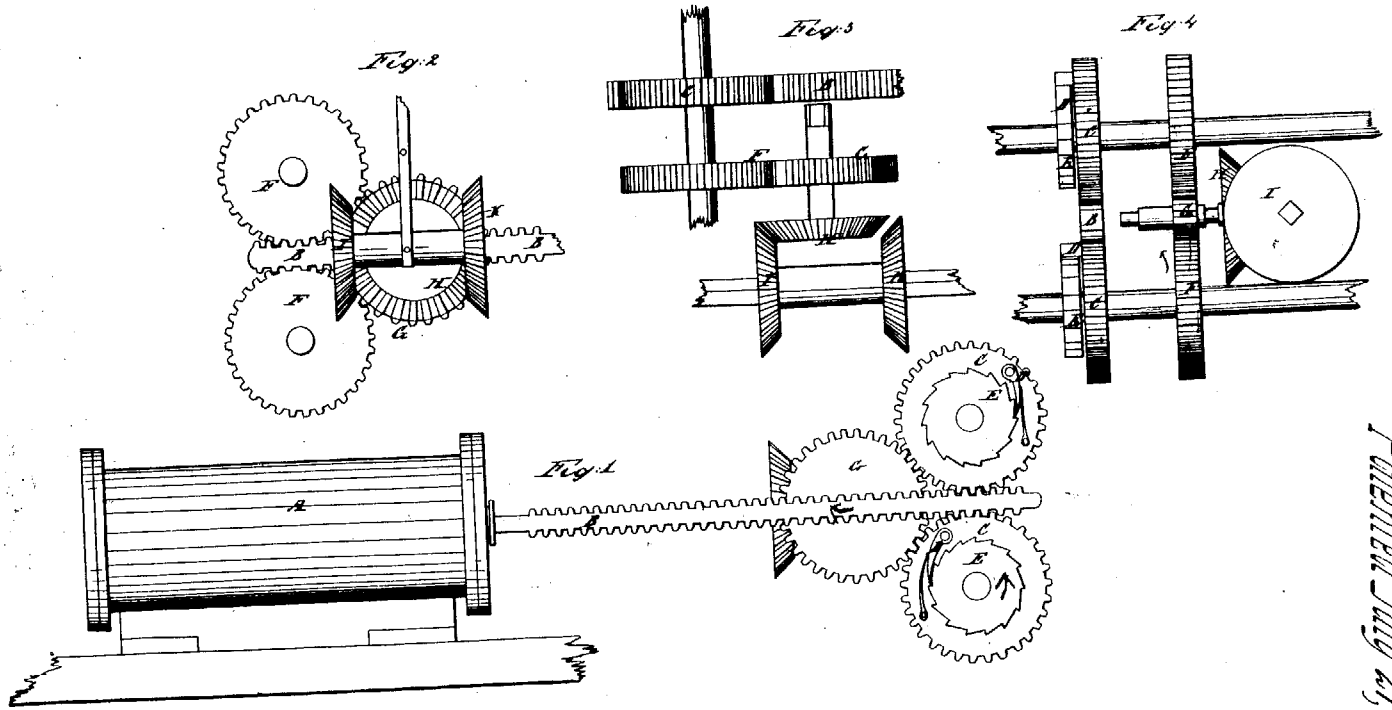
AM. PHOTO-LITHO. CO. N.Y. (OSBORNE'S PROCESS)

[illegible] 12.
July 27, 1833 275.
7688X

Elisha Bates.

Letters Patent.

The Schedule referred to in these Letters Patent, & making part of the same, containing a description in the words of the said Elisha Bates himself of his improvements in the application of Steam power. — —

This improvement consists chiefly in the application of the movement & impulse given to the piston of a steam engine, to a wheel instead of a crank. — The motion may be communicated from the piston rod, to a wheel or wheels, either by that rod operating directly on the wheel, or wheels, or by being connected with one or more bars, with, or without cogs, of any description, or with teeth, or clicks, or by pressure with or without the intervention of one or more levers.

The modes of application are various & numerous, but the principle is the same. — It is the application of the power of steam from a cylinder and its necessary appendages & fixtures to a wheel instead of a crank, or to so much of a wheel as shall keep the propelling power at, or about an equal distance, from the center of rotary motion. — I shall mention several of these modes of application, observing that I do not consider it necessary to describe all the modifications of machinery, by which the principle can be applied. — Thus for example — If the cylinder of the engine be in a horizontal position, let the piston rod be extended & formed into a bar (or a bar be attached to it) of suitable length & dimensions furnished with a sufficient range of cogs or teeth on each side, and supported by one or more rubs, or friction wheels, & suitably secured to move in a steady & proper direction. — Let it run between two cog wheels, of suitable dimensions, of the same size & same number of cogs, tho' the machine might possibly be made to operate, if these wheels were

7688 X were different in their proportions. — They should be fixed on their
respective spindles or shafts, not fast, but movably as the wheel
of a carriage on its axle; yet so that its movements shall be steady
Let there be by each of these wheels, on the same shaft or spindle
& immovably attach to its shaft, a rag wheel, into which one
or more clicks or catches, attached to the cog wheel, shall fall,
by their own weight or by springs; the teeth of the two rag wheels
being so set, that one rag wheel shall be propelled with one stroke
of the piston rod or cog bar, & the other rag wheel by the other, or
reversed stroke of the rod, or bar. — On each of these shafts or
spindles, & at the opposite ends from the first cog wheels & rag
wheels, let there be a cog wheel immovably attached to it, both
being of the same size & having the same number of cogs or teeth, &
geared into another cog wheel of the same size & number of cogs
or teeth. — These three wheels may be placed with their centers in a
right line, or in a triangular position; taking care in the latter
case, that the two outside wheels do not touch each other. —

This triangular arrangement will be necessary on no other
principle than to save room, or reduce the distance between the
two first wheels, that the cog bar may not be too wide.

The middle or 3d in wheel, transfers a rotary motion to all the
rest of the Machinery, in a manner so simple & obvious as
not to need description. —

But for the purposes of Steam boats, or any other pur-
pose where a reversed movement of the machinery is necessary
a wheel may be fixed on the end of the shaft of what I have called
the 3d wheel, to work in either of [illegible] two wheels or pinions or [illegible]
wallowers connected together by a collar, rather longer than the
diameter of the wheel that is to propel them, & made movable
endwise on the shaft they are to drive, but not to turn on it as
as a carriage wheel does on its axle. — Which movement end-
wise may be given when necessary by a lever, or otherwise,
so as to throw one of these double connected wheels out of gear,
with with the wheel just mentioned & put the other in gear.. These
double wheels bear some resemblance to a spool on which
thread &c is wound--- On pulling one of these wheels out of
gear & the other in, the movement of the shaft on which they
are fixed will be reversed.. Bevel gears will be preferable for
these three wheels.. The circumference of the two first wheels
which are driven by the cogbar, may bear any proportion desired
to the length of the stroke of the piston.. And the stroke of the piston
may be regulated or restrained by stops to the rod or bar, or by a
crank with or without a balance wheel, or by the admission of the
steam into the cylinder, & the manner of cutting it off.--

I have mentioned the horizontal position of the cylin=
der, merely for the sake of perspicuity.. But the wheels & other
parts of the machinery, may all be arranged to suit any
position of the cylinder; or an engine, on either the high
or low pressure principle.. In the latter case the cog bar
may be attached to one end of the great lever & move in a perpen
=dicular direction.. To the application of this principle there
may be an almost endless variety. The wheels may be moved
by cogs or teeth, or by catches, or by the simple pressure of the bar
upon their circumferences.. They may be made to revolve once
or more with each stroke, or only part of a revolution, in which
case they need not be entire wheels, but so much only as is
necessary to come in contact with the propelling bar and com
=municate the force to their shafts. The cog wheels too may
be not full wheels, if the clicks or catches are fixed to them
and made to fall into suitable stops in the cog wheels. Or instead
of a cog wheel, there might be a single arm or bar, so that a suitable
fixture may ensure that each of these first wheels, or parts of
wheels, may run loose on its shaft with one stroke of the piston
and with the next communicate its rotary motion to its shaft
and that this communication of power to the shafts shall be
as respects the two first wheels, alternate, and not both at at the same time, or rather that the impulses shall not coun=
teract each other, or a lever may be used in case of engines
on the low pressure principle.— To this lever or one similar,
may be fixed two bars, one on each side of the center of motion,
to which bars, cogs, teeth, or catches may be attached either
fixed or movable to operate alternately on two wheels on one
shaft; the bars being both on the same side of the shaft.
The wheels are to move freely (as in the first described
method, in one direction, by means of rag wheels, or any
other convenient mode. and communicate a rotary motion
in one direction to the shaft. On this shaft may be a cog
wheel, to give motion to any machinery required. But if
a reversed motion is necessary, as in steam boats, the last
mentioned wheel may be made to operate, on either of two
wheels, connected by a collar & movable endwise on
the shaft of the water wheel, as already described.
or the movement can be given to a single wheel, or part of a
wheel, by connecting the piston rod with an oblong frame,
wide enough to admit the wheel, or part of a wheel between
its sides; which sides on their inner edges are to be furnished
with cogs, or teeth, or catches there being on the circumfer=
ence of the wheels no more cogs than will permit the cogs
on one side of the frame, exactly to run out & become free
and clear when those on the other side enter or take hold.—
There must however be one movable cog on each side of the
frame to take hold of the wheel at the entering point like a
click or catch in advance of the permanent cogs, and one at
the delivering point that shall be snatched out of its hold, by
means of a suitable guide, at the moment the last permanent
cog lets go— that the frame may freely & constantly move back
with the reversed motion of the piston.——
I prefer the two first mentioned methods
of applying steam power, to the last, and rather favor
the

696

7688X the opinion, that it will be more advantageous to make
the two first wheels which are propelled by the piston rod,
or cog bar so smale as to revolve once, by each stroke of
the piston ,...... And possibly they might be made to
revolve to advantage even more than once to a stroke.
It will save machinery, power and ex-
pence to have them small (but not too small, & the
velocity of the last wheels or moving parts of the machinery
can be regulated or fixed by gearing
Mount pleasant Jefferson County Ohio 5th mo 23rd 1833
Witnesses
Ezekiel Harris }
Willm. S Bates }
Elisha Bates 1750 [illegible]